June 25, 1957     T. C. MULLIGAN     2,797,364
APPARATUS FOR DIMMING AUTOMOBILE HEAD LIGHTS
Filed Jan. 26, 1954
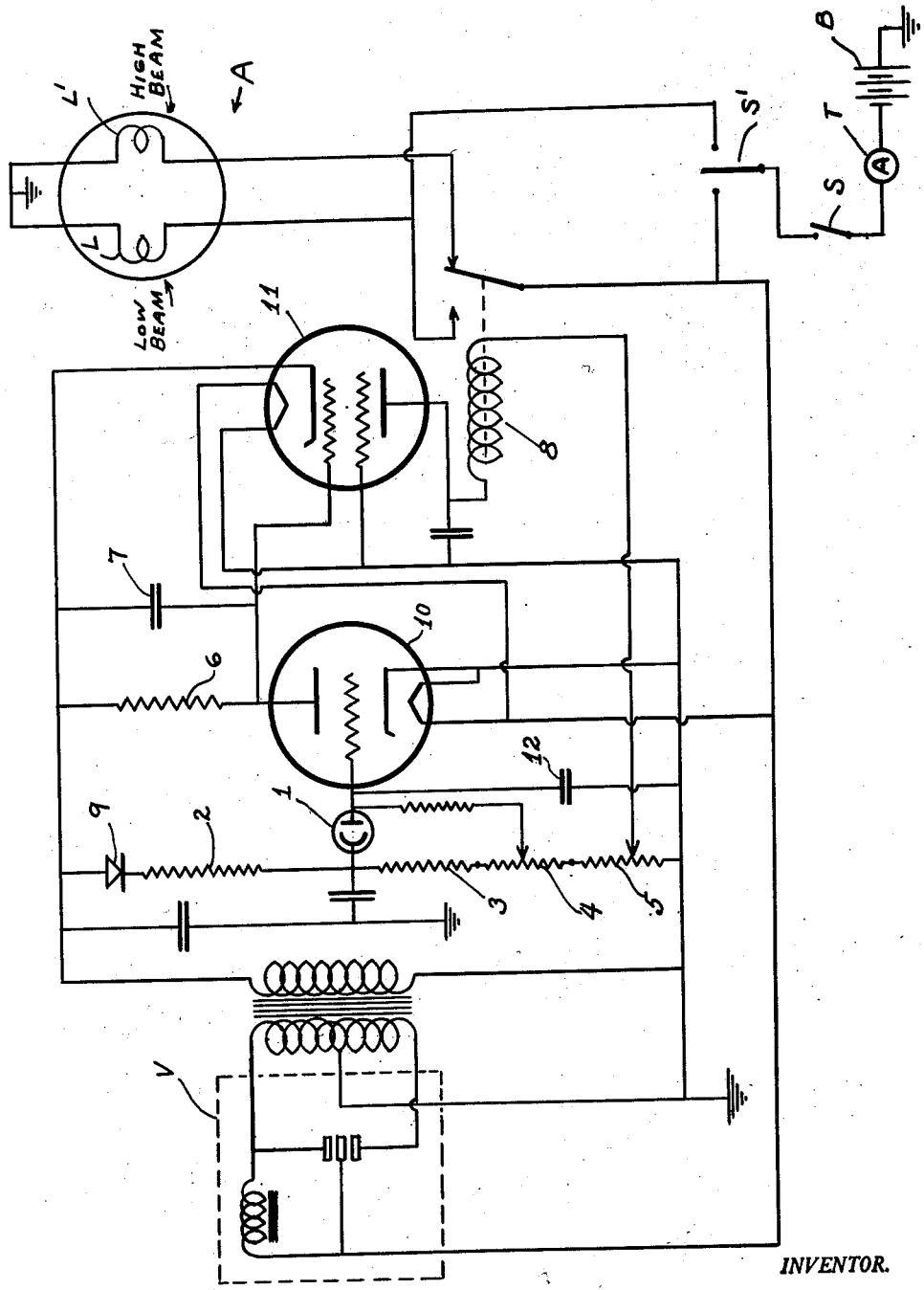
INVENTOR.
THOMAS C. MULLIGAN
BY Herman L. Gordon
ATTORNEY

United States Patent Office 2,797,364
Patented June 25, 1957

2,797,364

APPARATUS FOR DIMMING AUTOMOBILE HEAD LIGHTS

Thomas C. Mulligan, Corona, N. Y., assignor to Niles Breger, New York, N. Y.

Application January 26, 1954, Serial No. 406,199

10 Claims. (Cl. 315—83)

The present invention relates to improvements in apparatus for automatically dimming automobile head lights, one object of the invention being the provision of a method whereby the head lights are automatically controlled through a photoelectric cell circuit, the cell being placed in such a position that ordinary street lights and the like do not affect the headlights, and also whereby upon the approach of another car at night, its head lights affect this circuit with a delayed action, and not an instant dimming as is the present practice, and also whereby in making a turn into a side road or street, the head lights will remain on full, should the turn be in darkness.

Another object of this invention is the provision of an augmenting electronic device that in conjunction with the normal head light circuit, automatically dims the head lights upon the approach of a lighted car at night, and which is so constructed as to produce a delayed dimming, so that the driver has full lighted vision until the approaching car is within a predetermined distance, as 200 yards, before it is fully dimmed.

In order that the invention may be more fully understood and its numerous advantages appreciated, attention is invited to the single figure of the complete system or apparatus which is shown in diagram.

Referring to the drawing, A designates the auto head light electrical system as now used in most automobiles and trucks, and in which L—L' indicate the head lights, S the hand switch, S' the dimmer switch, and T the ammeter.

The automatic dimming apparatus employs an alternating current operated direct coupled direct current amplifier, powered by 6 or 12 volts, with battery B and vibrator V. A half wave rectifier 9, provides the direct current, operating potentials for the photoelectric cell 1, and the grid bias of the tube 10, through a resistance chain 2, 3, 4 and 5. The resistance 4 is a biasing adjustment, sensitivity control.

Thus when the cell 1 is non-conductive, the tube 10 draws its normal plate current, thereby biasing the tube 11, which is the relay tube, to cut-off by the voltage developed across the plate load resistor 6 of tube 10, charging condenser 7. It will thus be noted that the current in the plate circuit of the tube 11, passes through a resistance 5, which is in series with a light switching relay 8. Thus when the current starts to rise in this circuit, the voltage across its resistance 5, increases the negative voltage on the input grid of tube 10, thereby multiplying the input signal many times.

This arrangement drives the relay tube to its maximum operating current almost instantly by the action of a small light signal, thus providing positive and reliable switching action.

The switching referred to is of course the automatic changing from bright to dim, and vice versa, this being accomplished by the lights of an approaching car.

Also by the provision of a condenser 12 between the grid and cathode of tube 10, the circuit is provided with a delayed action when it automatically switches from bright to dim. This is incorporated to prevent the effect of dimming on account of momentary flashes of light, and permits the driver to proceed with a lighted roadway, for a safe distance before it fully becomes dimmed.

In installing this device in an automobile, its chassis is housed in a suitable cabinet and, is attached to the fire wall of the auto under the hood, while the photoelectric cell is attached at a point at the left front of the car below the left head light, and in such a position that a high light from street lamps and the like does not affect it. In this way, only direct lights such as from an approaching auto at night or from a brightly lighted road or street, actuate this system and automatic dimming occurs without any effort on the part of the operator or driver, after the head lights have been turned on. The present invention thus provides a safety apparatus that is reliable, readily installed and inexpensive in up-keep, as the tubes employed are readily obtainable at any radio or television store, and also with this apparatus, the normal auto battery is used.

From the foregoing description, it is evident that there is here provided an automatic head light dimming apparatus, that is simple in construction, inexpensive to install and maintain, and one that will prove safe driving at night at all times and without any undue strain on the driver, as is the case with foot and hand dimmers, and the high power automatic dimmer now on the market.

With this circuit, since the resistance 5 is in series with the relay 8, when the photo cell 1 becomes conductive, it places a negative voltage on the grid of the tube 10, and reduces the plate current thereof. This reduces the voltage drop across load resistance 6 and consequently reduces the negative bias on the grid of the tube 11, causing the tube 11 to conduct after condenser 7 has discharged to the reduced voltage. When the tube 11 starts conducting, its plate current passes through the resistance 5, thereby further increasing the negative voltage on the grid of the tube 10. This action gives high wattage switching energy to the light switching relay 8.

As above stated, when the photo cell 1 becomes conductive, it effectively connects the grid of tube 10 to a more negative point along the resistance chain 5, 4, 3, 2, namely, to the junction between resistors 3 and 2. Since a delay condenser 12 is connected between the grid and cathode of tube 10, a time delay is required for condenser 12 to charge to its new voltage. Thus, a time delay is provided in the decrease of plate current in tube 10. The condenser 7, connected between the grid and cathode of tube 11, provides the proper phase relationship between the change in plate current of tube 11 and the change in bias of the grid of tube 10 to cause the secondary increase in negative bias on said grid produced by the plate current of tube 11 to be in phase with the primary increase in negative bias on said grid caused by the conduction of photo cell 1. In other words, condenser 7 places the positive feed back voltage from output tube 11 in phase with the signal voltage on the grid of tube 10 produced by the action of photo cell 1.

The delay action provided by condenser 12 prevents the operation of the dimming circuit by momentary flashes of light acting on the photo cell 1.

What is claimed, is:

1. In an automatic motor vehicle headlight dimming device, a dimmer relay, a first electron valve device having a control electrode, an anode, and a cathode, a current source, a bias circuit connected across said source, means whereby uni-directional current flows in said bias circuit from said source, means connecting said control electrode to said bias circuit to place a normal bias voltage on said control electrode, a photo cell connected between said control electrode and a point on said bias circuit having a bias voltage value more negative than said normal bias voltage, whereby the negative bias on said control electrode is increased when said cell conducts, means connecting the cathode and anode of said first valve device across said source and including a load impedance, a second electron valve device having a control electrode, an anode, and a cathode, means connecting said second-named control electrode and second-named cathode across said load impedance to control the bias on said second control electrode in accordance with the anode current in said first valve device, and means connecting said dimmer relay in circuit with said second-named anode and said bias circuit at a point on said bias circuit which is positive with respect to the control electrode of the first electron valve device, whereby anode current of said second electron valve device acts in said bias circuit to further increase the negative bias on the control electrode of the first electron valve device.

2. In an automatic motor vehicle headlight dimming device, a dimmer relay, a first electron valve device having a control electrode, an anode, and a cathode, an alternating current source, a rectifying circuit connected across said source, means connecting said control electrode to said rectifying circuit to place a normal bias voltage on said control electrode, a photo cell connected between said control electrode and a point on said rectifying circuit having a bias voltage value more negative than said normal bias voltage, whereby the negative bias on said control electrode increases when said photo cell conducts, means connecting the cathode and anode of said first valve device across said source and including a load impedance, a second electron valve device having a control electrode, an anode, and a cathode, means connecting said second-named control electrode and second-named cathode across said load impedance to control the bias on said second-named control electrode, and means connecting said dimmer relay in circuit with said second-named anode and a point on said rectifying circuit which is positive with respect to the control electrode of the first valve device, whereby anode current of said second electron valve device acts in said rectifying circuit to further increase the negative bias on the control electrode of the first electron valve device.

3. The structure of claim 2, and a delay capacitance connected between the control electrode and the cathode of said first electron valve device.

4. In an automatic motor vehicle headlight dimming device, a dimmer relay, a first electron valve device having a control electrode, an anode, and a cathode, an alternating current source, a rectifying circuit connected across said source, means adjustably connecting said control electrode to said rectifying circuit to place a desired normal negative bias voltage on said control electrode, a photo cell connected between said control electrode and a point on said rectifying circuit having a bias voltage value more negative than said normal bias voltage, whereby the negative bias on said control electrode increases when said photo cell conducts, means connecting the cathode and anode of said first valve device across said source and including a load impedance, a second electron valve device having a control electrode, an anode, and a cathode, means connecting said second-named control electrode and second-named cathode across said load impedance to control the bias on said second-named control electrode, and means connecting said dimmer relay in circuit with said second-named anode and said rectifying circuit at a point on said rectifying circuit which is positive with respect to the control electrode of the first electron valve device, whereby anode current of said second electron valve device acts in said rectifying circuit to further increase the negative bias on the control electrode of the first electron valve device.

5. The structure of claim 2, and wherein said rectifying circuit includes a plurality of series-connected resistors, and wherein said control electrode is connected to said rectifying circuit at a point along said series-connected resistors.

6. In an automatic motor vehicle headlight dimming device, electron valve means including a control electrode and an output anode, a dimmer relay connected to said output anode, a bias circuit, a source of current, means connecting said bias circuit directly across said source, to continuously energize said bias circuit, means connecting a point on said bias circuit to said control electrode to place a potential on said control electrode, light-responsive means arranged to control the current in said bias circuit, and a feed back circuit from said output anode to said bias circuit formed and arranged to make said control electrode more negative responsive to current flow from said output anode to said bias circuit.

7. In an automatic motor vehicle headlight dimming device, a detector circuit comprising an electron valve having a control electrode and an anode, a dimmer relay, an output circuit connected to said anode and including said dimmer relay, a bias circuit, a source of current, means connecting said bias circuit directly across said source, to continuously energize said bias circuit, means connecting a point on said bias circuit to said control electrode to place a potential on said control electrode, light-responsive means arranged to control the current in said bias circuit and to vary said potential, a feed back circuit from said output circuit to said bias circuit, and means whereby current through said feed back circuit from said output circuit acts to affect the potential on said control electrode in the same sense as light received by said light-responsive means.

8. In an automatic motor vehicle headlight dimming device, a detector circuit comprising an electron valve having a control electrode and an anode, a dimmer relay, an output circuit connected to said anode and including said dimmer relay, a bias circuit, a source of current, means connecting said bias circuit directly across said source, to continuously energize said bias circuit, means connecting a point on said bias circuit to said control electrode to place a potential on said control electrode, light-responsive means connected to said bias circuit and arranged to control the current therein to make said control electrode more negative in response to light received by said light-responsive means, a feed back circuit from said output circuit to said bias circuit, and means whereby current through said feed back circuit from said output circuit acts to affect the potential on said control electrode in the same sense as light received by said light-responsive means.

9. In an automatic motor vehicle headlight dimming device, a detector circuit comprising an electron valve having a control electrode and an anode, a dimmer relay, an output circuit including said dimmer relay, means whereby said output circuit is normally deenergized and becomes energized in response to a decrease in anode current in said electron valve, a bias circuit, a source of current, means connecting said bias circuit directly across said source, to continuously energize said bias circuit, means connecting a point on said bias circuit to said control electrode to place a potential on said control electrode, light-responsive means connected to said bias circuit and arranged to control the current therein to make said control electrode more negative in response to light received by said light-responsive means, whereby said output circuit becomes energized, a feed back circuit from said output circuit to said bias circuit, and means whereby current through said feed back circuit from said output circuit acts to affect the potential on said control electrode in the same sense as light received by said light-responsive means.

10. In a motor vehicle headlight system, a high beam filament, a low beam filament, normally deenergized relay means arranged to normally energize the high beam filament and arranged to deenergize the high beam filament and energize the low beam filament in response to the energization of said relay means, a detector circuit comprising an electron valve having a control electrode and an anode, a normally deenergized output circuit including said relay means, means whereby said output circuit and relay means become energized in response to a change in anode current in said electron valve, a bias circuit, a source of current, means connecting said bias circuit directly across said source, to continuously energize said bias circuit, means connecting a point on said bias circuit to said control electrode to place a potential on said control electrode, light-responsive means connected to said bias circuit and arranged to control the current therein to vary said potential in accordance with light received by said light-responsive means, a feed back circuit from said output circuit to said bias circuit, and means whereby current through said feed back circuit from said output circuit acts to affect the potential on said control electrode in the same sense as light received by said light-responsive means.

References Cited in the file of this patent

UNITED STATES PATENTS

| | | |
|---|---|---|
| 2,082,627 | Haugh | June 1, 1937 |
| 2,375,456 | Wolfner | May 8, 1945 |
| 2,493,307 | Moore | Jan. 3, 1950 |
| 2,516,675 | Carne | July 25, 1950 |
| 2,560,748 | Silva | July 17, 1951 |
| 2,571,981 | Wensel | Nov. 16, 1951 |